United States Patent [19]

Moh

[11] Patent Number: 5,740,250
[45] Date of Patent: Apr. 14, 1998

[54] TAME AUTOMORPHISM PUBLIC KEY SYSTEM

[76] Inventor: Tzuong-Tsieng Moh, 305 Park La., West Lafayette, Ind. 47906

[21] Appl. No.: 694,995

[22] Filed: Aug. 9, 1996

Related U.S. Application Data

[60] Provisional application No. 60/008,676 Dec. 15, 1995.
[51] Int. Cl.$^6$ .................................................. H04K 1/00
[52] U.S. Cl. .................................................. 380/28; 380/30
[58] Field of Search .................................................. 380/28, 29, 30, 380/49, 4

[56] References Cited

U.S. PATENT DOCUMENTS

| 4,875,207 | 10/1989 | Van Twist et al. | 370/85.12 |
| 5,377,207 | 12/1994 | Perlman | 371/37.1 |

OTHER PUBLICATIONS

International Search Report corresponding to PCT/US96/19708.

Abhyankar, S.S. and Moh, T.T. "Embeddings of the line in the plane. Journal fur die rein und angewandte Mathematik", pp. 148–166, vol. 27 (1975).

Bajaj, C. Garrity, T. Warren, J. On the Application of Multi–Equational Resultants. Purdue University, Department of C.S. Technical Report CSD–TR–826, 1988.

Hopcroft, J.E., Ullman, Jeffrey D. "Formal Languages and Their Relation to Automata, Motivation", pp. 8–9, Addison–Wesley Publishing Co.

Berlekamp, E.R., "Factoring polynomials over fine fields. Bell System Tech. J". pp. 1853–1859, vol. 46, 1967.

Brandstrom, H. "A public–key cryptosystem based upon equations over a finite field. Cryptologia", pp. 347–358, vol. 7, 1983.

Brent, R., and Kung, H. "Fast Algorithms for Manipulating Formal Power Series. Journal of ACM", pp. 581–595, vol. 25, No. 4, 1978.

Cohen, Henri "A Course in Computational Algebraic Number Theory. Springer–Verlag". Berlin, 1993.

Canny, John F. "Complexity of robot Motion Planning" The MIT Press, Cambridge, Massachusetts, 1988.

Dickerson, Mathew "The inverse of an Automorphism in Polynomial Time. J. Symbolic Computation", vol. 13, 209–220, 1992.

Lidl, R. "Finite fields". Addison–Wesley, Reading, Massachusetts, 1983.

Lidl, R. "On Cryptosystems Based on Polynomials and Finite Fields." Advances in Cryptology (Proceedings of Eurocrypt 84), pp. 10–15, 1983.

Moh, T.T. "On the Classification Problem of Embedded Lines in Characteristic p. Algebraic Geometry and Commutative Algebra in honor of M. Nagata", vol. 1, pp. 267–280, Kinokuniya, Kyoto, Japan, 1988.

Nagata, M. "On the automorphism group of K[X,Y].", vol. 5, Kinokuniya, Tokyo, Japan, 1972.

(List continued on next page.)

*Primary Examiner*—David C. Cain
*Attorney, Agent, or Firm*—Baker & Daniels

[57] ABSTRACT

The present invention relates to a tame automorphism based encryption system or scheme. Let K be a finite field of $2^m$ elements. Let $\phi_4, \phi_3, \phi_2, \phi_1$ be tame automorphisms (see above) of the ring $K[x_1, \ldots, x_{n+r}]$. Let the composition be $\pi = \phi_4 \phi_3 \phi_2 \phi_1$. The automorphism $\pi$ and the factorization $\pi = \phi_4 \phi_3 \phi_2 \phi_1$ are hidden. Let $\pi = (\pi_1(x_1, \ldots, x_{n+r}), \ldots, \pi_{n+r}(x_1, \ldots, x_{n+r}))$. The field K and the polynomials $(f_1, \ldots, f_{n+r}) = (\pi_1(x_1, \ldots, x_n, 0, \ldots, 0), \ldots, \pi_{n+r}(x_1, \ldots, x_n, 0, \ldots, 0))$ will be announced publicly. Let $(x'_1, \ldots, x'_n)$ be the plaintext. Then the cyphertext will be $(y'_1, \ldots, y'_{n+r}) = (f_1(x'_1, \ldots, x'_n), \ldots, f_{n+r}(x'_1, \ldots, x'_n))$. It is easy to find $\phi_i^{-1}((y'_1, \ldots, y'_{n+r}))$ (see Corollary 2). Therefore, it is easy to recover the plaintext $(x'_1, \ldots, x'_n) = \phi_1^{-1} \phi_2^{-1} \phi_3^{-1} \phi_4^{-1} \pi((\pi_1, \ldots, x'_n))$. However without knowing the automorphism $\pi$ precisely and the decomposition $\pi = \phi_4 \phi_3 \phi_2 \phi_1$, it is very hard to find plaintext $(x'_1, \ldots, x'_n)$. The encryption system or scheme may be applied to electronic message transmission, data storage, smart card security, and product verification applications.

32 Claims, 3 Drawing Sheets

OTHER PUBLICATIONS

Niederreiter, H. "New Deterministic Factorization Algorithm for Polynomials over Finite Fields." Contemporary Mathematics (Finite Fields) (AMS), vol. 168, 1993.

Rivest, R.L. Shamir, A., and Adleman, L.M."A Method for Obtaining Digital Signatures and Public Key Cryptosystems". Communications of the ACM 21(2), 120–126, Feb. 1978.

Van Der Kulk, W. "On polynomial rings in two variables," Nieuw Archief voor Wiskunde. vol. 3, I(1953).

Bresinsky, H., "On Prime Ideals with Generic Zerio $x_i = t^{n_i}$", American Mathematical Society, vol. 47, No. 2, Feb., 1975.

TAME AUTOMORPHISM PUBLIC KEY SYSTEM

CROSS REFERENCE TO RELATED APPLICATIONS

This application claims the benefits under Title 35, U.S.C. §119(e) of the U.S. Provisional Application Serial No. 60/008,676, filed Dec. 15, 1995.

BACKGROUND OF THE INVENTION

1. Field of the Invention

The present invention relates to public key cryptography.

2. Related Art

Cryptography systems or schemes are used to encode messages that are either preserved or transmitted electronically, to preserve the privacy and the integrity of the messages, as well as to authenticate the originator of the message.

In single key cryptography, or symmetric cryptography, a single key is used to encrypt and decrypt data or a transmitted message according to a predetermined mathematical formula. In the single or symmetric cryptography method, the single key must be maintained in secrecy or else the encrypted data or message may be easily decrypted.

A more secure encryption system involves a two-key encryption method. A typical asymmetric encryption system includes both a public key, a code made generally available to some media, and a private key, a code which is made available only to the rightful owner of the data or intended recipients of the message. Known asymmetric public key encryption systems include RSA and hybrid PGP systems. The RSA method uses the RC2, RC4, or RC5 encryption algorithm. In the hybrid PGP encryption systems, the encryption algorithm initially begins by converting a plain text data or message into a cyphertext data and message with a "session key" which is the symmetric IDEA method. The "session key" is then encrypted with the public key of the rightful owner of the data or the recipient of the message in the asymmetric RSA key distribution system, and the recipient decrypts the session key using the private key to extract the plain texts from the cyphertexts.

In conventional public key encryption systems, the public key of the user is used to identify a user, to avoid the problem of forgeries of data or impostors sending encrypted messages where the recipient is deceived into thinking another individual sent the message. To digitally sign a message, the sender needs only apply the private key, so anyone else can verify the authenticity of the message by applying the sender's public key.

In another application, to avoid the forgery of a product, say U.S. dollar bills, one can select the serial numbers to be special, say last nine digits all zeros, then uses the private key to encrypt the serial numbers. The detectives can use the public key to discover forgeries quickly.

However, these various public key encryption algorithms present their own computational difficulties. What is needed in the art is an improved public key encryption system to provide privacy, integrity, and authentication of data and electronic communications.

SUMMARY OF THE INVENTION

The present invention relates to a tame automorphism based public key encryption system or scheme. The present invention contemplates a computer program which implements the tame automorphism base encryption algorithm to encrypt and decrypt messages either sent electronically or encoded physically.

A computer would first apply an encryption algorithm of the present invention to encode a plaintext data or message to be transmitted electronically. The encryption method produces a cyphertext data or message for sending via an electronic medium. The computer system of the rightful owner of the data or the message recipient would decrypt the cyphertext by using the tame automorphism based decryption algorithm to extract the original plaintext message. In this way, data may be secured, and messages may be securely transmitted over the airwaves or an open network.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
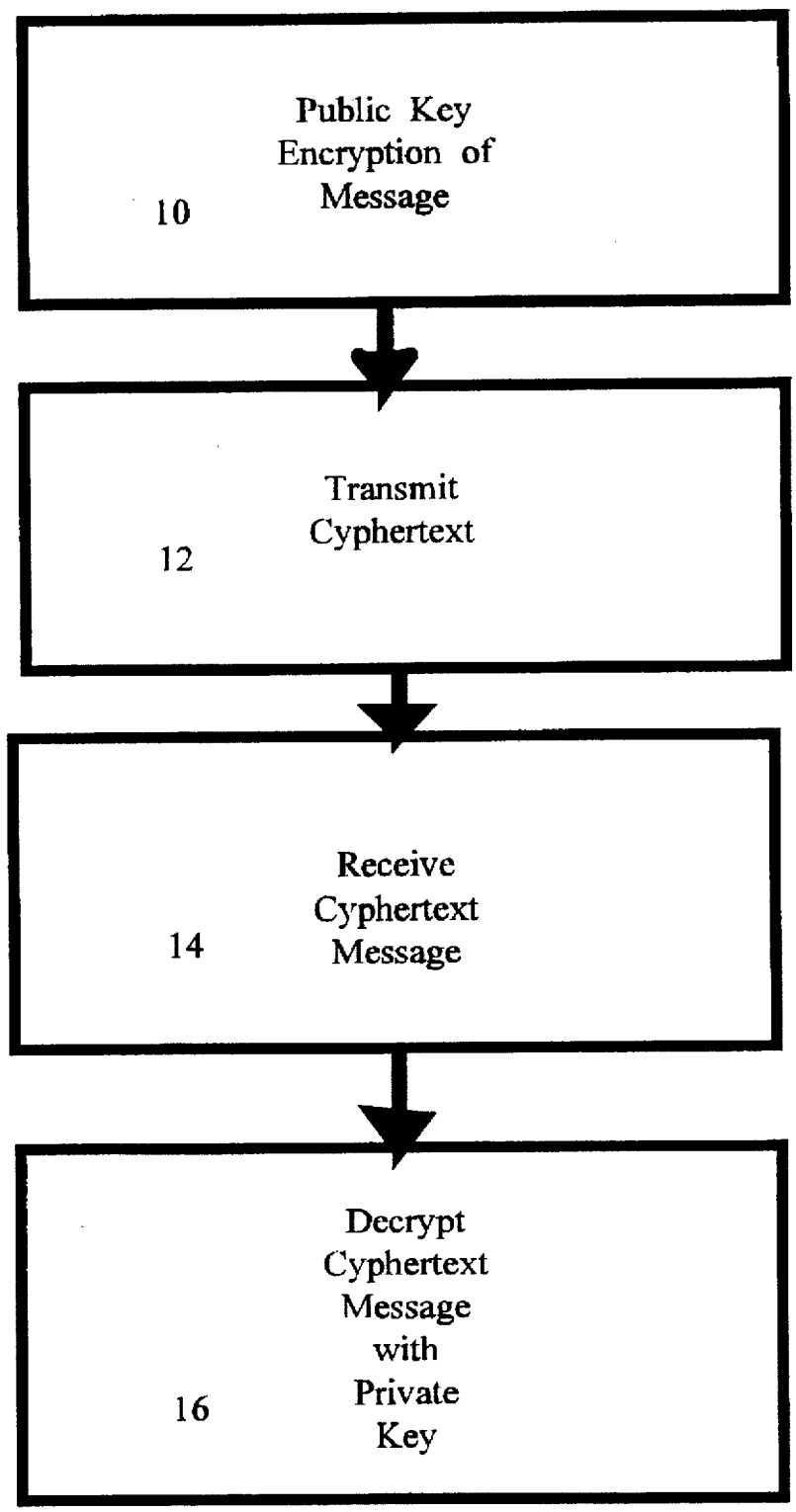
FIG. 1 is a flow chart diagram of a first method of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in one/several form(s), and such exemplifications are not to be construed as limiting the scope of the invention in any manner.

DESCRIPTION OF THE INVENTION

The embodiment disclosed below is not intended to be exhaustive or limit the invention to the precise form disclosed in the following detailed description. Rather, the embodiment is chose and described so that others skilled in the art may utilize its teachings. The encryption and decryption method of the present invention is not limited to a particular hardware or system configuration, rather may be broadly applied in a variety of computer hardware and computer software settings.

The invention involves the preservation of data, authentication of data, and the transmission of messages, in digital or analog form, wherein the data or message is subject to an encryption algorithm, and is decoded using decryption algorithm. In a public key methodology, one of the two encryption keys is made generally available, while the other encryption key is maintained privately.

FIG. 1 shows a flow chart of a public-private key encryption scheme. In step 10, the message is encrypted into cyphertext using a tame automorphism based algorithm, as explained in greater detail below. The cyphertext message is transmitted in step 12, so that it is received in step 14. Finally the cyphertext is decrypted with a private key in step 16, again using a tame automorphism based algorithm.

Figure 2:
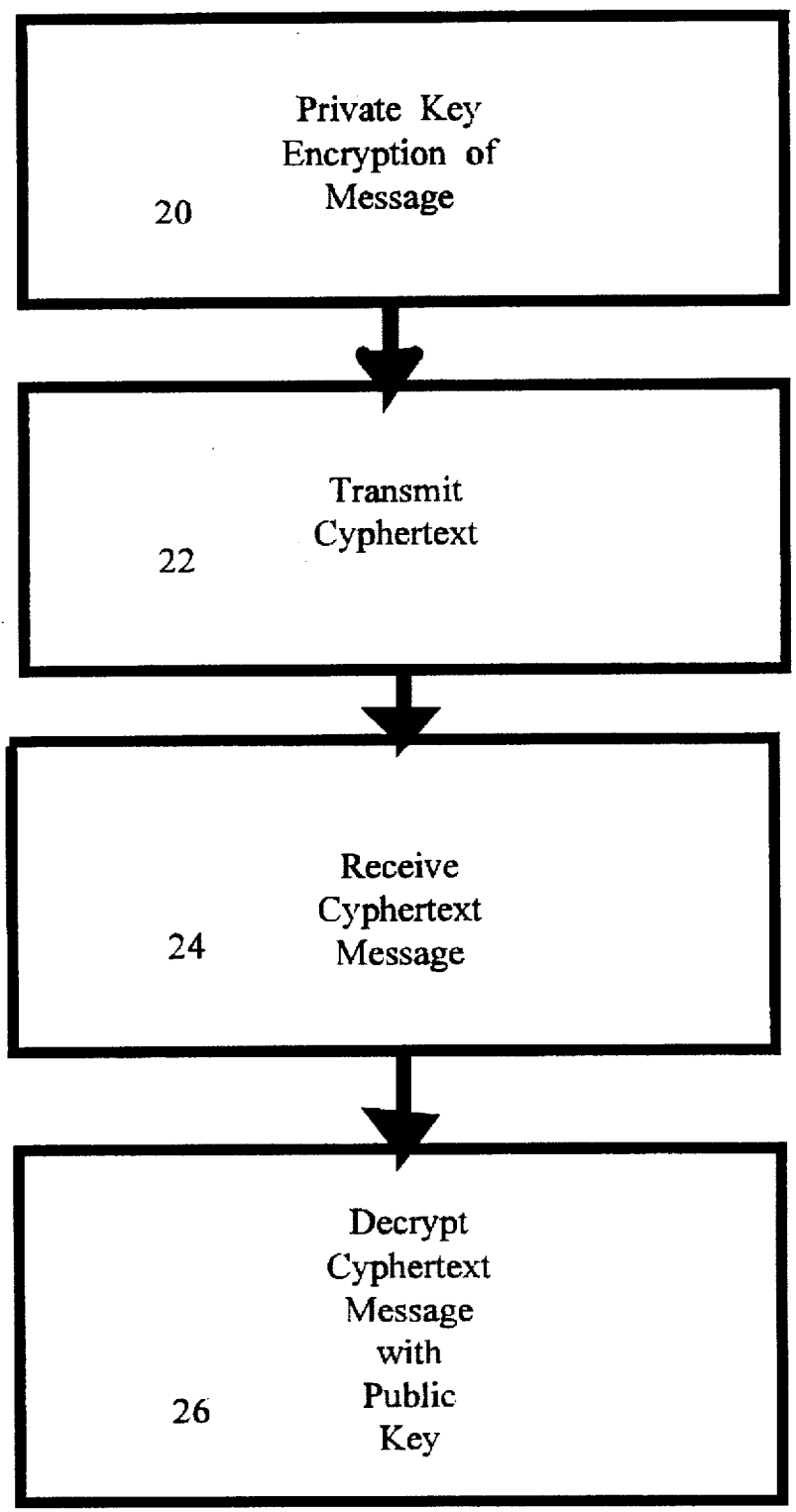
FIG. 2 is a flow chart diagram of a second method of the present invention.

A similar procedure is shown in FIG. 2, but with the initial encryption step 20 using a private key. Steps 22 and 24 relate to sending and receiving the cyphertext, with step 26 decrypting the cyphertext with a public key.

Figure 3:
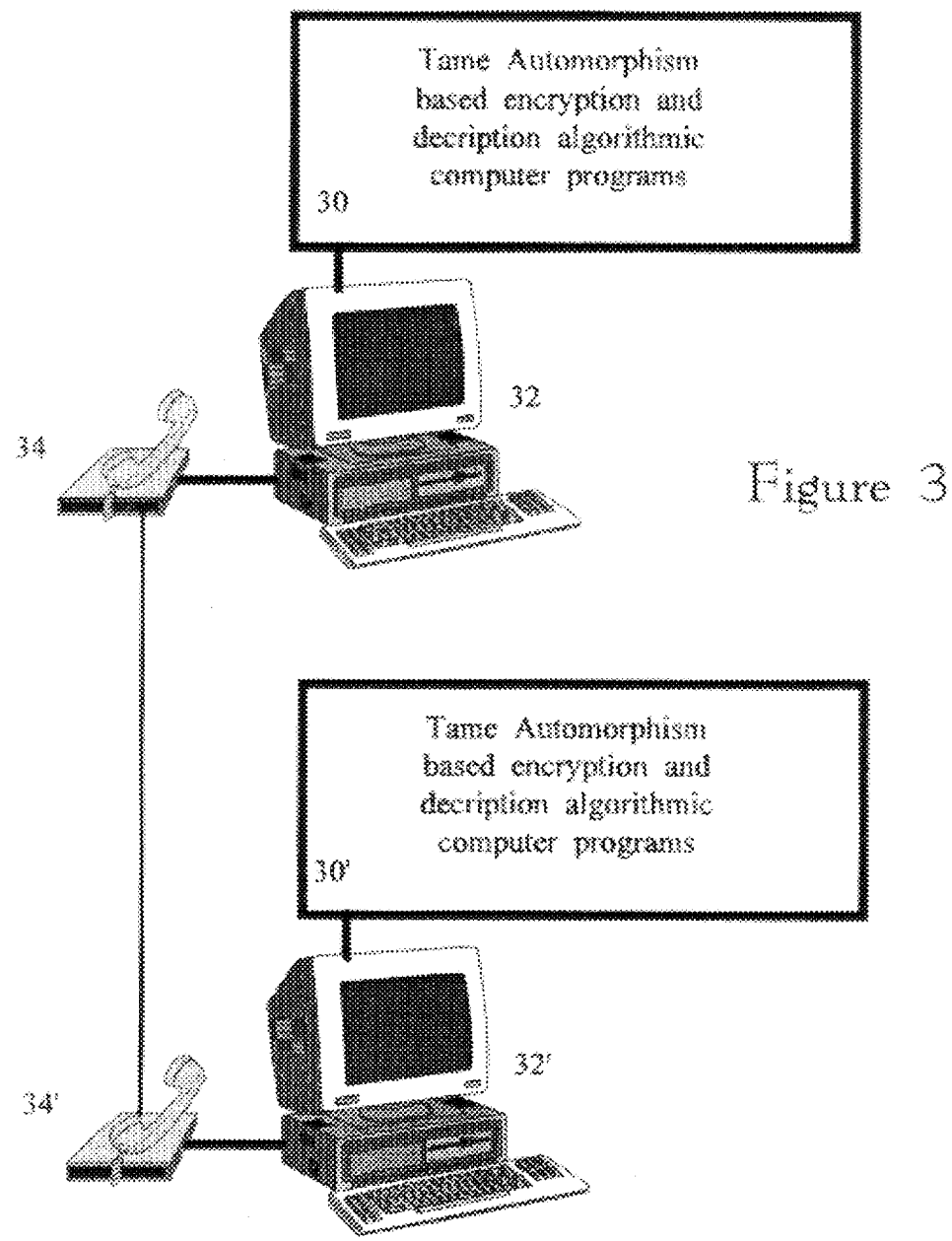
FIG. 3 is a schematic diagram of a computer system of the present invention.

A computer system implementing these steps is depicted in FIG. 3. Computers 32 and 32' include programs 30 and 32' which enable the tame automorphism based encryption and decryption algorithms. Transmission devices 30 and 30', such as a modem, a smart card (e.g., an electronically preprogrammed debit card), a hard disk file system, or a physical item's serial number, may be used to transmit the message. The method of the invention may also be used to encrypt data stored on computer 32 or 32' to prevent tampering. Although electronic communication is greatly enhanced by the present invention, the methods of the present invention may also be applied to physical communications for authentification purposes. In order to establish the encryption algorithm, it is necessary to define the mathematical parameters of the equations used to perform the encryption and decryption.

Mathematical Background

[1]. Introduction

Let K be a finite field of $q=2^m$ elements. Let $K[x_1, \ldots, x_n]$ be the polynomial ring of n variables, $x_1, \ldots, x_n$, over K. Consider a sequence of automorphisms $\phi_i$ of $K[x_1, \ldots, x_n]$ defined either as, (1): $\phi_i(x_1) = x_1 + h_i(x_2, \ldots, x_n)$
(2): $\phi_i(x_2) = x_2$
...
(n): $\phi_i(x_n) = x_n$ or as, $\phi_i$=invertible linear transformations The automorphisms above are called tame automorphisms. It is easy to see that the inverse of a tame automorphism is also a tame automorphism, and is of either the following form:

(1)': $\phi_i^{-1}(x_1) = x_1 - h_i(x_2, \ldots, x_n)$
(2)': $\phi_i^{-1}(x_2) = x_2$
...
(n)': $\phi_i^{-1}(x_n) = x_n$ or as $\phi_i^{-1}$=invertible linear transformations The group generated by all tame automorphisms is called the tame automorphism group. It is an open problem in mathematics whether the automorphism group of $K[x_1, \ldots, x_n]$ is the tame automorphism group for n>2.

Remark 1: The linear transformation $\phi_i$ can be either the identity map or a permutation. Obviously, the order of the variables $x_1, \ldots, x_n$ is not significant. Let $\pi = \Pi \phi_i$ be an element in the tame automorphism group. Then we have $y_i = \pi(x_i) = f_i(x_1, \ldots, x_n)$ for $i=1, \ldots, n$     (1)°

$x_i = \pi^{-1}(y_i) = g_i(y_1, \ldots, y_n)$ for $i=1, \ldots, n$     (2)°

Remark 2: In general, it is convenient to require that a tame automorphism $\phi$ is either a linear transformation or of the following forms in any order of the variables $x_1, \ldots, x_n$.

(1)'': $\phi_i(x_1) = x_1 + h_{i1}(x_2, \ldots, x_n) = y_1$
(2)'': $\phi_i(x_2) = x_2 + h_{i2}(x_3, \ldots, x_n) = y_2$
...
(j)'': $\phi_i(x_j) = x_j + h_{ij}(x_{j+1}, \ldots, x_n) = y_j$
...
(n)'': $\phi_i(x_n) = x_n = y_n$ PROPOSITION:. Let a tame automorphism $\phi_i$ be defined as in the preceding paragraph. We have the inverse $\phi_i^{-1}(y_j) = y_j - h_{ij}(\phi_i^{-1}(y_{j+1}), \ldots, \phi_i^{-1}(y_n))$.

PROOF: Trivial.
For instance, in the case of four variables, we have $\phi_i^{-1}(y_1) = y_1 - h_{i1}(y_2 - h_{i2}(y_3 - h_{i3}(y_4), y_4), y_3 - h_{i3}(y_4), y_4)$ $\phi_i^{-1}(y_2) = y_2 - h_{i2}(y_3 - h_{i3}(y_4), y_4)$ $\phi_i^{-1}(y_3) = y_3 - h_{i3}(y_4)$ $\phi_i^{-1}(y_4) = y_4$ In general, the total degree of $\phi_i^{-1}(y_1)$ increases very fast. It is hard to write down the polynomials $\phi_i^{-1}(y_j)$.

COROLLARY 1:. Given the set $\{y'_j\}$, it is easy to find the values $\{\phi_i^{-1}(y'_j)\}$ by induction; first, we have $\phi_i^{-1}(y'_n) = y'_n$, inductively if we have $\phi_i^{-1}(y'_{j+1}), \ldots, \phi_i^{-1}(y'_n)$, then we have $\phi_i^{-1}(y'_j) = y'_j - h_{ij}(\phi_i^{-1}(y'_{j+1}), \ldots, \phi_i^{-1}(y'_n))$.

Proof: Trivial.

COROLLARY 2:. Given the decomposition $\pi = \Pi_{i=1}^{i=n} \phi_i$ where $\phi_i$ are tame automorphisms of the above forms, it is easy to find $\pi^{-1}(y'_i)$.

Proof: As usual, $\pi^{-1} = \Pi_{i=1}^{i=n} \phi_i^{-1}$. It follows from Corollary 1.

Remark 3: The inverse map $\phi_i^{-1}$ as polynomials is hard to write down because their degrees could be very high as indicated by our later discussions. We can show that if n=2 and deg $f_1 \geq 2$, then the highest degree forms of $f_1$, $f_2$ must be powers, up to some non-zero constants, of the same linear form and deg $f_1$, deg $f_2$ are divisible by the smaller one of the two degrees (cf [1],[12],[13],[17]). Therefore the inverse $g_i$ can be recovered inductively by performing further tame automorphism to cut down the degrees. However, for $n \geq 3$, the above considerations are no longer valid.

Remark 4: For $n \geq 3$, there is no known theorem to decompose an element $\pi$ in the tame automorphism group into product of tame automorphisms $\Pi \phi_i$.

Remark 5: If $n \geq 4$, let $\{m_i: i=1, \ldots, n\}$ be positive integers, let $I_m$ be the ideal of the kernels of the maps $\tau_m$: $K[x_1, x_2, \ldots, x_n]$ to $K[t]$ by $\tau_m(x_i) = t^{m_i}, m_i > 0$ then the numbers of the minimal generators of the ideals $I_m$ are unbounded. (cf [6]).

The Public Key System

Principle: Let the user select two tame automorphism $\phi_1, \phi_2$, let $\pi = \phi_2 \phi_1$ and hide the decomposition. The user shall announce publicly the map $\pi$ as polynomials $\pi(x_i) = f_i(x_1, \ldots, x_n)$, and the field K.

Let $x'_1, \ldots, x'_n \in K$ be the plaintext. The sender evaluates $y_i = f_i(x_1, \ldots, x_n)$ $(=\pi(x_i))$ at $x'_1, \ldots, x'_n$ for the values of $x_1, \ldots, x_n$. Let the results be $y'_1, \ldots, y'_n$. These will be the cyphertext.

The legitimate receiver recovers the plaintext by $x'_i = \pi^{-1}(y'_i)$ $(=g_i(y'_1, \ldots, y'_n)) = \phi_1^{-1}(\phi_2^{-1}(y'_i))$ which can be done easily according to Corollary 2.

Remarks 6: In general, we may consider $\pi = \phi_k \ldots \phi_2 \phi_1$ for the product of $k \geq 2$ tame automorphims. Note that for the tame automorphism group of $K[x_1, \ldots, x_n]$, the unique factorization of an element as a product of tame automorphisms is unknown. For $k \geq 3$, it is not known that if there are always tame automorphisms $\Psi_1, \Psi_2$ such that $\pi = \phi_k \ldots \phi_2 \phi_1 = \Psi_2 \Psi_1$.

One possible way to carry out the above Principle is as follows: Select $n \geq 3$ and positive integers s, t. Let the field K be $F_{2^m}$ the finite field of $2^m$ elements. The user selects an element $\pi$ of the tame automorphism group in the following way.

$$\phi_1(x_1) = x_1 \tag{1}*$$

$$\phi_1(x_j) = x_j + h_j(x_1, \ldots, x_{j-1}) + p_j(x_1) \deg(h_j) = s, \deg(p_j) > s \text{ for } j=2, \ldots, n$$

$$\phi_2(x_j) = x_j + q_j(x_{j+1}, \ldots, x_n), \deg q_j \leq t \text{ for } j=1, \ldots, n-1 \tag{3}*$$

$$\phi_2(x_n) = x_n \tag{4}*$$

$$\phi(x_i) = \phi_2 \phi_1(x_i) = f_i(x_1, \ldots, x_n) \tag{5}*$$

An Example

Let $m=1$, $n=101$, $s=100$. Furthermore, let $q_j(x_{j+1}, \ldots, x_{101})$ be a homogenous polynomial (which may be zero, if necessary) of degree 4 such that it has the following properties (1): each variable could appear at most linearly in every term. (2): each variable appears either exactly in two terms or not at all, and let $\tau_{ji}(x_1), s_j(x_1)$ be polynomials of $x_1$ of degrees less than 99. Let us consider the following example.

$$\phi_1(x_1) = x_1 \tag{1}**$$

$$(2)**: \phi_1(x_j) = x_j + \sum_{i \neq k, 1 < i, k \leq j} x_i x_k + s_j(x_1) + \sum_{1 < i < j} r_{ji}(x_1) x_i + x_{j-1} x^{99} +$$

$$\sum_{k=100+j-1} x_1^k, \text{ for } j = 2, \ldots, 101$$

$$\phi_2(x_j) = x_j + q_j(x_{j+1}, \ldots, x_{101}), \text{ for } j=2, \ldots, 101 \tag{3}**$$

$$\phi_2(x_n) = x_n \tag{4}**$$

$$\pi(x_i) = \phi_2 \phi_1(x_i) = f_i(x_1, \ldots, x_{101}) = y_i \tag{5}**$$

Let us count the number of terms in the sets $\{r_{ji}(x_i)\}$, $\{s_j(x_1)\}=2$, we have 100 terms for $s_2(x_1)$. For $j=3$, we have 100 terms for $s_3(x_1)$ and 100 terms for $r_{3,2}$, continuously, for $j=101$ we have 100 terms for $s_{101}(x_1)$ and 9,900 terms for $r_{101,2}, \ldots, r_{101,100}$. Totally, there are possibly 505,000 terms in the sets $\{r_i(x_1)\}, \{s_j(x_1)\}$. Therefore the number of possible $\phi_1$ is greater than $2^{505,000} \equiv 10^{151,500}$. The inverse $\pi$ is of the following form;

$$\pi^{-1}(y_i) = \phi_1^{-1} \phi_2^{-1}(y_j) = x_j = g_j(y_1, \ldots, y_{101}))$$

Note that it follows from Remark 2 that each polynomial $\phi_1^{-1}(y_i)$ of variable $y_1, \ldots, y_{101}$ is of degree $> 99^{i-1}$ for $i=1, \ldots, 101$. Note that the degrees are fairly large. Furthermore, it follows from Corollary 2 that it is easy to recover $x'_1, \ldots, x'_{101}$ from $y'_1, \ldots, y'_{101}$ for the legitimate user who knows $\phi_1, \phi_2$.

Cryptoanalysis for the System

It is not expensive for the legitimate user to select $n$, $m$, $s$, $t$, $h_j$, $p_j$, $q_j$, the tame automorphism $\pi$, and to construct the inverse map $\pi^{-1} = \phi_1^{-1} \phi_2^{-1}$ (cf Corollary 2), the polynomials $f_i$ for $i=1, \ldots, n$.

The expense to the sender is mainly in evaluating polynomials $y'_i = f_i(x'_1, \ldots, x'_n)$.

There are four ways to attack the system. (1) let $x_i$ be polynomials of $y_i$ with indeterminate coefficients. Do enough experiments using $x_i$ to determine $y_i$ and then solve the system of linear equations in the indeterminate coefficients to find polynomials $g_i$ or (2) apply resultant to $y_i = f_i(x_1, \ldots, x_n)$ to recover plaintext $x_i$, or (3) find the maps $\phi_1, \phi_2$ directly or (4) use Newton Polyhedron Method to fined the maps $\phi_1, \phi_2$.

Let us discuss the costs involved for the above four ways;

(1) As we pointed out in Remark 2 that the total degrees of $g_j$ are very high, for discussions, we may assume that they are all of degree $2s$. Then there are $n \times (2s+1)(2s+2) \cdots (2s+n-1)/n!$ possible terms. That is the dimension of the linear system. We conclude that it takes at least $((1/(n-1)!)(2s)^n)^{2.5}$ steps of multiplications to solve the system. In the field K, every multiplication takes $2m$ shift operations. Totally, it takes $2m((1/(n-1)!)(2s)^n)^{2.5}$ shift operations to solve the system.

For instance, in our previous example let us use the Sterling Formula and the following approximate estimate.

$$n! \cong (n/e)^n \tag{1}$$

$$e^7 \cong 10^3 \tag{2}$$

then the number of shift operations needed is greater than $10^{183}$.

Take a fast computer which is capable of execution $10^9$ steps per second. Note that 1 year=$3.1536 \times 10^7$ seconds. It will take about $10^{166}$.

(2) Use resultant to eliminate variables $x_j$ from the equations $y_i = f_i(x_1, \ldots, x_n)$ and then solving the equations in last variable $x_i$ to get the expressions $x_i = g_i(y_1, \ldots, y_n)$.

The known complexity analysis (cf pg 75[6]) is $O(n^3 s^{5n} \log^2 (dm))$. In our example, the number of shift operations needed is greater than $10^{509}$. A fast computer will spend $3 \times 10^{492}$ years to do it.

(3) Find the maps $\phi_1, \phi_2$ directly. The forms of $\phi_1$ is covered up in the final forms of $\pi(x_1)$. We shall find $\phi_2$ first. Let us consider the case that the polynomial $g_j(x_{j+1}, \ldots, x_n)$ is homogeneous of degree 4. There are $(n(n+1)(n+2)(n+3))/4!$ monomials of degree 4 in n variables. That is the dimension of the space of the possible polynomials $q_j$ in the above Equation (3)*.

In our previous example, let us find a simple lower bound of the number $\tau$ of the possible $q_j$ in (3)**. Assume we separate all variable $x_2, \ldots, x_{101}$ into 11 blocks of 8 variables and one 12 variables. Let us consider the following expression.

$$x_2 x_3 x_4 x_5 + x_4 x_5 x_6 x_7 + x_6 x_7 x_8 x_9 + x_8 x_9 x_2 x_3$$

The number of all possible similar expressions is $8!/2^4 4$. The corresponding one for the block of 12 variables is $12!/2^5 6$. Therefore we have $\tau \geq (100!/8!^{11} 12!)(8!/2^6)^{11}(12!/2^7 3) \equiv (100^{100}/8^{88} 12^{12}) 6.20) 10^{31} (1.24) 10^7 > (2.89) 10^{147}$ In other words, it takes at least $10^{130}$ years for a fast computer to just look at all cases.

(4) The Newton Polyhedron Method is to study the convex hall of the set of the exponents of non-zero terms of $f_i$ in n-dimensional space. This method may provide valuable informations about the polynomials $f_i$. Many data are provided by the number of appearances of variables $x_j$ mod 2 in $f_i$. From those data we may speculate about the polynomial $q_j + (x_{j+1}, \ldots, x_{101})$. In our example, those data are hidden.

Signatures.

Since we use automorphisms $\pi$, then given any $y'_1, y'_2, \ldots, y'_n$, the legitimate user can easily produce $x'_1, x'_2, \ldots, x'_n$ with $x'_i = \pi(y'_i)$ as the digital signature.

The Public Key Scheme.

We will enhance the above method of the tame automorphisms to produce the following Public Key Scheme (see section [3]). One of the advantages is that all polynomials involved are quadratics. To this end we will first discuss the following technical section [2].

[2] Two Concepts.

Let $h_1, \ldots, h_s$ be polynomials in variables $x_1, \ldots, x_t$. If we consider polynomials in $h_1, \ldots, h_s$, then some form, r, in $x_1, \ldots, x_t$ may be the highest degree forms of a polynomial Q in $h_1, \ldots, h_s$. We shall have the following definition.

DEFINITION. Let $r(x_1, \ldots, x_t)$ be a form. Let the generating degree, in symbol gendeg(r), be the minimal degree of $Q(h_1, \ldots, h_s)$ such that $$Q(h_1(x_1, \ldots, x_t) \ldots, h_s(x_1, \ldots, x_t)) = r + \text{lower terms}$$

If the above conditions are satisfied, then Q is called a (minimal) generating polynomial of r. If there is no such polynomial Q, then we define gendeg(r)=∞.

EXAMPLE 1

Let the field K be of $2^m$ elements, t=16 and s=27. Let $h_3 = x_1 x_2;$ $h_4 = x_1 x_3;$ $h_5 = x_1 x_4;$ $h_6 = x_1 x_5;$ $h_7 = x_2 x_4;$ $h_8 = x_2 x_5;$ $h_9 = x_3 x_4 + x_6 x_7;$ $h_{10} = x_3 x_5 + x_8 x_9;$ $h_{11} = x_3 x_6;$ $h_{12} = x_5 x_7;$ $h_{13} = x_3 x_9;$ $h_{14} = x_4 x_8;$ $h_{15} = x_6 x_8;$ $h_{16} = x_6 x_9;$ $h_{17} = x_7 x_8 + x_{10} x_{11};$ $h_{18} = x_7 x_9 + x_{12} x_{13};$ $h_{19} = x_7 x_{10};$ $h_{20} = x_9 x_{11};$ $h_{21} = x_7 x_{12};$ $h_{22} = x_8 x_{13};$ $h_{23} = x_{10} x_{12};$ $h_{24} = x_{11} x_{13};$ $h_{25} = x^2_1 + x_{14};$ $h_{26} = x^2_{14} + x_{15};$ $h_{27} = x^2_{15} + x_{16};$ Then the following Q is a generating polynomial of $x^2_{16}$ of degree 8 in $h_i$.

$$Q = h^4_1 h^4_2 + h^4_3 h^4_4 + h^4_5 h^4_6 + h^2_7 h^2_8 (h^2_9 h^2_{10} + h^2_{11} h^2_{12} + h^2_{13} h^2_{14}) + h^2_7 h^2_8 h_{15} h_{16} (h_{17} h_{18} + h_{19} h_{20} + h_{21} h_{22} + h_{23} h_{24}) + h^8_{25} + h^4_{26} + h^2_{27}$$

The following example will be used later.

EXAMPLE 2

Let the field K be of $2^m$ elements. Let $p_1 = x^2_1;$ $p_2 = x^2_2;$ $p_3 = x_3 x_2;$ $p_4 = x_1 x_3 + x_4 x_2;$ $p_5 = x_1 x_4 + x_5 x_2;$ $p_6 = x_1 x_5 + x_6 x_2;$ $p_7 = x_1 x_2 + x_5 x_6;$ Then the following P is the minimal defining polynomial of the above polynomials over K.

$$P = p^7_2 p^2_7 + p_1 p^8_2 + (p^2_2 p^2_5 + p_1 p_2 p^2_4 + p^2_1 p^2_3)(p_1 p^2_2 p^2_5 + p^2_1 p_2 p^2_4 + p^3_1 p^2_3 + p^3_2 p^2_6)$$

Note that it is of degree 9.

Remark 6: The polynomials Q,P will be used to construct a public key scheme in the next section. The security of the scheme depends on the degrees Q,P and their complexities. However, the degrees of Q,P can be increased easily by the technique of the two examples. Therefore, any attack based on the degrees Q,P being 8,9 would not be taken seriously.

Let us introduce a new number as follows. Let $h_i$ be a polynomial of $(x_1, \ldots, x_t)$ with degree form $q_i$. Let us define the diffdim $(h_i)$=dim (the vector space generated by $\{\alpha q_i / \alpha x_j: j=1, \ldots, t\}$). Note that diffdim $h_i=0,2,4$ in our previous examples.

[3] Scheme.

Any pair of polynomials Q,P similar to the ones in the previous section can be used to produce a scheme. Let us consider the two example in the previous section and use their notations, especially the generating polynomial $Q(h_1, \ldots, h_{27})$ and the polynomials $h_1, \ldots, h_{27}$, homogenous polynomials $p_i$. Let n=70, r=30. Let the field K be $F_{2^m}$ the finite field of $2^m$ elements. Let us use the following notations: we shall separate the indices i=1, ..., 64 to the 10 blocks as i=1, i=1+j+7k where j=1, ..., 7 and k=0, ..., 8. The user selects the following randomly $\alpha_i = \alpha_i(x_1, \ldots, x_i)$=linear form involving $x_i$, for i=1, ..., 70

$\beta_i$=linear form in $\{x_1, \ldots, x_{54}\}$, for i=65, ..., 70, 98, 99, 100

$\gamma_i$=linear form in $\{x_1, \ldots, x_{54}\}$, for i=65, ..., 70, 98, 99, 100

The user selects $\phi_1$ to be any random invertible linear transformation such that $\phi_1(x_i) = a_i + \text{linear forms in } \{x_1, \ldots, x_{70}\}$ with $a_i \neq 0$, for i, ..., 70

$\phi_1(x_i) = x_i$, for i=71, ..., 100

The user selects $\phi_2, \phi_3$ to be the tame automorphisms satisfies the following conditions (1)*–(7)* and $\phi_4$ an invertible linear transformation satisfying the condition (8)* in the following way $$\phi_2(x_1) = x_1 \qquad (1)^*$$

$$\phi_2(x_i) = \alpha_i + p_j(x_{1+6k}, \ldots, x_{6+6k}), \text{ where } i=1+j+7k, \text{ for } i=2,\ldots,64 \qquad (2)^*$$

$$\phi_2(x_i) = \alpha_i + \beta^2_i + \gamma_i, \text{ for } i=65,\ldots,70 \qquad (3)^*$$

$$\phi_2(x_i) = x_i + h_{i-70}(x_{55},\ldots,x_{70}), \text{ for } i=71,\ldots,97 \qquad (4)^*$$

$$\phi_2(x_i) = x_i \beta^2_i + \gamma_i, \text{ for } i=98,99,100 \qquad (5)^*$$

$$\phi_3(x_j) = x_j, \text{ for } j=2,\ldots,100 \qquad (6)^*$$

$$\phi_3(x_1) = x_1 + b_1 Q(x_{71},\ldots,x_{97})), b_1 \neq 0 \qquad (7)^*$$

$$\pi(x_i) = \phi_4 \phi_3 \phi_2 \phi_1(x_i) = \pi_i(x_1,\ldots,x_{100}), \pi_i(0,\ldots,0) = 0 \qquad (8)^*$$

The field K and the polynomials $f_i(x_1,\ldots,x_{70}) = \pi_i(x_1,\ldots,x_{70},0,\ldots,0)$ for $i=1,\ldots,100$ will be announced publicly.

Detail Description of the Scheme

Due to the notations and indices involved in the preceding paragraph, we shall write down concrete formula for $\phi_2$ as follows.

$$\phi_2(x_1) = x_1 \qquad (1)^*$$

$$\phi_2(x_2) = \alpha_2 + p_1(x_1,\ldots,x_6) = \alpha_2 + x^2_1, \qquad (2)^*$$

$$\phi_2(x_3) = \alpha_3 + p_2(x_1,\ldots,x_6) = \alpha_3 + x^2_2, \qquad (2)^*$$

$$\phi_2(x_4) = \alpha_4 + p_3(x_1,\ldots,x_6) = \alpha_4 + x_3 x_2, \qquad (2)^*$$

$$\phi_2(x_5) = \alpha_5 + p_4(x_1,\ldots,x_6) = \alpha_5 + x_3 x_1 + x_4 x_2, \qquad (2)^*$$

$$\phi_2(x_6) = \alpha_6 + p_5(x_1,\ldots,x_6) = \alpha_6 + x_4 x_1 + x_5 x_2, \qquad (2)^*$$

$$\phi_2(x_7) = \alpha_7 + p_6(x_1,\ldots,x_6) = \alpha_7 + x_5 x_1 + x_6 x_2, \qquad (2)^*$$

$$\phi_2(x_8) = \alpha_8 + p_7(x_1,\ldots,x_6) = \alpha_8 + x_1 x_2 + x_5 x_6, \qquad (2)^*$$

$$\phi_2(x_9) = \alpha_9 + p_1(x_7,\ldots,x_{12}) = \alpha_9 + x^2_7, \qquad (2)^*$$

$$\phi_2(x_{10}) = \alpha_{10} + p_2(x_7,\ldots,x_{12}) = \alpha_{10} + x^2_8, \qquad (2)^*$$

$$\phi_2(x_{58}) = \alpha_{58} + p_1(x_{49},\ldots,x_{54}) = \alpha_{58} + x^2_{49}, \qquad (2)^*$$

$$\phi_2(x_{59}) = \alpha_{59} + p_2(x_{49},\ldots,x_{54}) = \alpha_{59} + x^2_{50}, \qquad (2)^*$$

$$\phi_2(x_{60}) = \alpha_{60} + p_3(x_{49},\ldots,x_{54}) = \alpha_{60} + x_{51} x_{50}, \qquad (2)^*$$

$$\phi_2(x_{61}) = \alpha_{61} + p_4(x_{49},\ldots,x_{54}) = \alpha_{61} + x_{51} x_{49} + x_{52} x_{50}, \qquad (2)^*$$

$$\phi_2(x_{62}) = \alpha_{62} + p_5(x_{49},\ldots,x_{54}) = \alpha_{62} + x_{52} x_{49} + x_{53} x_{50}, \qquad (2)^*$$

$$\phi_2(x_{63}) = \alpha_{63} + p_6(x_{49},\ldots,x_{54}) = \alpha_{63} + x_{49} x_{53} + x_{54} x_{50}, \qquad (2)^*$$

$$\phi_2(x_{64}) = \alpha_{64} + p_7(x_{49},\ldots,x_{54}) = \alpha_{64} + x_{49} x_{50} + x_{53} x_{54}, \qquad (2)^*$$

$$\phi_2(x_{65}) = \alpha_{65} + \beta^2_{65} + \gamma_{65} \qquad (3)^*$$

$$\phi_2(x_{70}) = \alpha_{70} + \beta^2_{70} + \gamma_{70} \qquad (3)^*$$

$$\phi_2(x_{71}) = x_{71} + h_1(x_{55},\ldots,x_{70}) = x_{71} + x^2_{55} + x_{56} x_{57}, \qquad (4)^*$$

$$\phi_2(x_{72}) = x_{72} + h_2(x_{55},\ldots,x_{70}) = x_{72} + x^2_{55} + x_{58} x_{59}, \qquad (4)^*$$

$$\phi_2(x_{73}) = x_{73} + h_3(x_{55},\ldots,x_{70}) = x_{73} + x_{55} x_{56}, \qquad (4)^*$$

$$\phi_2(x_{74}) = x_{74} + h_4(x_{55},\ldots,x_{70}) = x_{74} + x_{55} x_{57}, \qquad (4)^*$$

$$\phi_2(x_{96}) = x_{96} + h_{26}(x_{55},\ldots,x_{70}) = x_{96} + x^2_{68} + x_{69}, \qquad (4)^*$$

$$\phi_2(x_{97}) = x_{97} + h_{27}(x_{55},\ldots,x_{70}) = x_{97} + x^2_{69} + x_{70}, \qquad (4)^*$$

$$\phi_2(x_{98}) = x_{98} + \beta^2_{98} + \gamma_{98} \qquad (5)^*$$

$$\phi_2(x_{99}) = x_{99} + \beta^2_{99} + \gamma_{99} \qquad (5)^*$$

$$\phi_2(x_{100}) = x_{100} + \beta^2_{100} + \gamma_{100} \qquad (5)^*$$

Plaintexts, Users and Compactness:

Let us count the possible number of plaintexts; since the number of plaintexts is just the number of choices for $x'_1,\ldots,x'_{70}$, we see that there are $2^{70m}$ such plaintexts. To have a rich scheme and to prevent the attackers from forming tables of plaintext-cyphertext, and to avoid the usage of the following identities over the finite field $F^m_2$ to cut down the degrees, $$x^{2^m}_i - x_i = 0$$

it is suggested to require $m \geq 20$.

Of equal importance to have a large number of possible plaintexts is having lots of possible users. In order to allow for many such users, we first get an expression for this number in terms of m and 70. This amounts to count the number of automorphisms $\phi$ of the form $\phi = \phi_1 \phi_2 \phi_3 \phi_4$. Assuming that a negligible proportion of these automorphism $\phi$ have more than one representation $\phi = \phi_1 \phi_2 \phi_3 \phi_4 = \phi'_1 \phi'_2 \phi'_3 \phi'_4$, the number of users is asymptotic to (choices for $\phi_4$)×(choices for $\phi_3$)×(choices for $\phi_2$)×(choices for $\phi_1$). The number of invertible linear transformations $\phi_1$ is $\Pi^n_{j=1}(2^{mj}-1) \cong 2^{mn(n-1)/2} \cong 2^{3003m}$. A similar count of terms of $\phi_4$ shows that the total possible number of users is $> 2^{7953m}$.

It follows from Corollary 2 and the preceding conditions that we have, $$\max\{\deg_{y_1} \phi^{-1}_2(x_j)\} \geq 2^{13}$$

Since $\phi_1, \phi_4$ are linear transformations, therefore the theoretic total number of terms in $\pi^{-1}$ is $100 (\Pi_i(2^{13}+i))/100! > 10^{254}$. Note that the form of the map $\pi$ is not given to the public. Without knowing it, it is impossible to compute $\pi^{-1}$.

We will study the compactness of the scheme. It is easy to see that the number of terms of polynomials of degree 2 is $(71)(72)/2!$, and we have 100 polynomials, therefore the total number of terms is 255,600. Using a simple trick, we may reduce the number to 191,988. We believe that the numbers may be further reduced. This is the cost to the senders. For the legitimate receiver, the number of terms for $\phi^{-1}_1, \phi^{-1}_2, \phi^{-1}_3, \phi^{-1}_4$ is 25,000.

As the technique improves, and new generating polynomial and defining polynomial Q,P discovered, the number of terms will be reduced.

Error Detecting Function

Upon receiving the cypertext $(y'_1,\ldots,y'_{100})$, the user apply $\phi^{-1}_1 \phi^{-1}_2 \phi^{-1}_3 \phi^{-1}_4$ to decode and get $(\bar{x}_1,\ldots,\bar{x}_{100})$. If one of $\bar{x}_{71},\ldots,\bar{x}_{100}$ is not zero, then there must be an error.

Master Key Function

Select a group of indices from 98, 99, 100. Select $\phi_4$ such that the corresponding subspace generated by $x_i$ with i from this group of indices and the subspace generated by $x_j$ of the remaining indices from $1,\ldots,100$ are both invariant. The original scheme is the master key. Another key can be produced by deleting all $f_i$ with i from this group of indices.

Another way to produce a master key is to find a polynomial $Q(f_1,\ldots,f_n,\ldots,f_{n+r+s})$, such that both it and its specialization $Q(f_1, \ldots, f_{n+r}, 0, \ldots, 0)$ can be used to construct public key scheme. Then we require that $\phi_1$ to keep that space $\{c_1, \ldots, c_{n+r}, 0, \ldots, 0\}$ invariant and use the specialization $x_i \to 0$ for $i=n+r+1, \ldots, n+r+s$ to create a master key.

The 'master key-ordinary key' relation can be broken by alternating any one of the 4 linear transformations $\phi_1, \phi_4$ involved.

Signatures

The map $\hat{\pi}$ is not an onto map. However, we may restrict to a suitable subspace. Let $V=\{(d_1, \ldots, d_j, 0, \ldots, 0)\}$ where $j$ is a fixed integer less than or equal to 54, say 50. Let $\bar{V}=\phi_1^{-1}(V)$. We shall require that $\phi_4$ induces a linear transformation on $W=\{(e_1, \ldots, e_j, 0, \ldots, 0)\}$. Let $\tau: (c_1, \ldots, c_j, \ldots, c_{100}) \to (c_1, \ldots, c_j)$ be a projection. Then clearly $\tau\pi$ in an one to one and onto map from $\bar{V}$ to the j-dimensional affine space. Moreover, the map is tame, and its inverse can be found if the values $(y'_1, \ldots, y'_j)$ are known. The inverse forms a signature.

[4] Cryptanalysis for the Scheme.

I. Direct Methods

It is not expensive for the legitimate user to select $\alpha_j, \beta_j, \gamma_j, b_j$, the tame automorphism $\pi$, and to construct an inverse map $\pi^{-1}=\phi_1^{-1}\phi_2^{-1}\phi_3^{-1}\phi_4^{-1}$ (cf Corollary 3), the polynomials $f_i(x_1, \ldots, x_{70})=\pi_i(x_1, \ldots, x_{70}, 0, \ldots, 0)$ for $i=1, \ldots, 100$.

The expense to the sender is mainly in evaluation polynomials $y'_i=f_i(x'_1, \ldots, x'_{70})$.

There are three direct ways to attack the scheme, (1) use the 'inverse formula' for power series to find the polynomial expressions of $\pi^{-1}$(cf [9]). Note that only $\hat{\pi}$ is given, and there is no way to find $\pi^{-1}$ which does not exist theoretically, or (2) let $x_i$ be polynomials of $y_i$ with indeterminate coefficients. Do enough experiments using $x_i$ to determine $y_j$ and then solve the system of linear equations in the indeterminate coefficients to find polynomials $g_i$ or (3) using resultant to the expressions $y'_i=f_i(x'_1, \ldots, x'_{70})$ to eliminate all $x'_i$ except one, and recover the expressions of $x'_j$ in terms of $y'_1, \ldots, y'_{100}$.

At this moment, the number of terms of the inverse map $\pi^{-1} \asymp (10^{254})$ which is beyond reach. The above three methods are ineffective. The only possible way of attacking is to recover $\phi_i$ or their equivalent forms.

II. Search for the Generating Polynomial

Knowing the recipe of the construction of the public key scheme, one may launch a step by step search as follows. We consider all monomials of some fixed degree of all polynomials $f_1, \ldots, f_{100}$. It follows from Example 1 & 2 of section 4 that we have to consider polynomials of degree 9 or 8 in $f_1, \ldots, f_{100}$. For degree 9, the dimension is $C^{108}_9 \approx 4(10^{12})$. For degree 8, the dimension is $\approx 3.26(10^{11})$. They are beyond the reach of present day computing technology. We may select Q.P with higher degrees to defend the scheme if necessary.

III. Identify Degree Forms

We should try to find $v_i$=the highest degree forms of $\phi_2(x_i)$. Let the highest degree forms of $f_i=u_i$. Let U={the vector space generated by $u_i$}. As we pointed out in section 4 that the diffdim of some polynomial $h_i$ is 4. Then we want to find suitable numbers $(z_1, \ldots, z_{100})$ such that for some fixed k, $$w = \sum_{i=1}^{100} z_i u_i = v_k$$

and diffdim$(v_k)$=4. A necessary condition is that all partial derivatives, $w_j$, of $w$ with respect to $x_j$ span a vector space of dimension=4. Let $u_{ij}=\Sigma a_{ijk}x_k$ be the partial derivative of $u_i$ with respect to $x_j$. We have several ways of using the above information.

A: Let $A_j$ be the 100×100 coefficient matrix $(a_{ijk})$, and $A=\Sigma_{i=1}^{100} z_i A_i$. Let us assume that A is of rank 4 with coefficients linear forms in the variables $z_i, \ldots, z_{100}$. It produces 100 homogeneous equations in 100 variables of degree 5. It follows from pg 75 of [7] that the time required to solve the equations is $O(m^2(100)^2 5^{500}) \equiv m^2 10^{337}$.

B: Since the diffdim (vk)=4, for some $c_1, c_2, c_3, c_4, c_5$, we have $\Sigma_{j=1}^5 c_j w_j=0$. Let $B_j$ be the 100×100 coefficient matrix $(a_{ijk})$, and $B=\Sigma_{j=1}^5 c_j B_j$. Then B is of rank <100 with coefficients linear forms in the variables $c_i, \ldots, c_5$. It produces 5 homogenous equations in 5 variables of degree 100. It follows from pg 75 of [7] that the time required to solve the equations is $O(m^2 5^2 (100^{25}))$. The number is $\equiv m^2 2.5(10^{51})$.

C: We may try random tuple $(u'_1, \ldots, u'_5)$ from that number field $F_{2M}$. The total possibility is $2^{5m} \equiv 10^{30}$ if we take m=20.

Note that there are 3 $(10^7)$ seconds in a year. Let us use a fast computer which operate $10^9$ shift operations a second. Then it takes about $m^2 10^{320}, m^2 10^{34}, 10^{13}$ years respectively for the above method A, B, C to find the quadratic forms.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

REFERENCES

[1] ABHYANKAR, S. S. and MOH, T. T., Embeddings of the line in the plane., Journal für die reine und angewandte Mathematik., 276 (1975), 148–166.

[2] BAJAJ, C. GARRITY, T. WARREN, J., On the Application of Multi-Equational Resultants, Purdue University, Dept. of C.S. Technical Report CSD-TR-826 (1988).

[3] BERLEKAMP, E. R., Factoring polynomials over finite fields, Bell System Tech. J., 46 (1967), 1953–1859.

[4] BRANDSTROM, H., A public-key cryptosystem based upon equations over a finite field, Cryptologia, 7 (1983), 347–358.

[5] BRENT, R., and KUNG, H.., Fast Algorithms for Manipulating Formal Power Series, Journal of ACM., 25 Number 4 (1978), 581–595.

[6] BRESINSKY, H., On Prime Ideals with Generic Zero $x_i=t^{ni}$, Proc. Amer. Math Soc., 47 Number 2 (1975), 329–332.

[7] CANNY, JOHN F., The Complexity of Robot Motion Planning, The MIT Press, Cambridge, Massachusetts, 1988.

[8] COHEN, HENRI, A course in Computational Algebraic Number Theory, Springer-Verlag, Berlin Heidelberg New York London Paris Tokyo Hong Kong Barcelona Budapest, 1983

[9] DICKERSON, MATHEW, The inverse of an automophism in Polynomial Time, J. Symbolic Computation (1992 (13)), 209–220.

[10] LIDL, R and H. NIEDERREITER, Finite fields, Addison-Wesley, Reading, Mass., 1983.

[11] LIDL, R. On Cryptosystems Based on Polynomials and Finite Fields, Advances in Cryptology (Proceedings of EUROCRYPT 84) (1984), 10–15.

[12] MOH, T. T., On the Classification Problem of Embedded Lines in Characteristic p., Algebraic Geometry and Commutative Algebra in honor of M. Nagata (1988) Vol. I, 267–280.

[13] NAGATA, M., On the automorphism group of K[X,Y]., Lectures in Mathematics, Tokyo, 1972.

[14] H. NIEDERREITER, New Deterministic Factorization Algorithms for Polynomials over Finite Fields, Contemporary Mathematics (Finite Fields), 168 (1993), 251–268.

[15] R. L. RIVEST, A. SHAMIR & L. ADLEMAN, A Method for Obtaining Digital Signatures and Public Key Cryptosystems, ACM 21, 120–126 (February 1978).

[16] J. HOPCROFT, J. ULLMAN, Introduction to Automata Theory, Languages & Computation, Addison Wesley, Reading, Mass., 1979.

[17] W. VAN DER KULK, On polynomial rings in two variables., Nieuw Archief voor Wiskunde. (3). I (1953), 33–41.

What is claimed is:

1. A method of electronically transmitting messages comprising the steps: applying an encryption algorithm to encode a plain text message into a cyphertext message for electronic transmission; transmitting the cyphertext message over an electronic medium; receiving the cyphertexted message; and decrypting the cyphertext message, characterized in that the encrypting and decrypting steps utilize a tame automorphism based algorithm using a product of at least two automorphism based polynomials as an encryption key and a mapping of the inverse of said encryption key as a decryption key in said applying and decrypting steps.

2. The method of claim 1 characterized in that the tame automorphism based algorithm includes an equation of one of the forms in any order of the variables $x_i, \ldots, x_n$:

(1): $\phi_1(x_1) = x_1 + h_{11}(x_2, \ldots, x_n) = y_1$;
(2): $\phi_1(x_2) = x_2 + h_{12}(x_3, \ldots, x_n) = y_2$;
...
(j): $\phi_1(x_j) = x_j + h_{ij}(x_{j+1}, \ldots, x_n) = y_j$;
...
(n): $\phi_1(x_n) = x_n = y_n$; and, any linear transformation of the above mentioned equations, where each term of the form $h_{ij}(x_{j+1}, \ldots, x_n)$ is a polynomial of a known order.

3. The method of claim 2 characterized in that the tame automorphism based algorithm utilizes two encryption keys, a public key $\pi(x_1) = \phi_k \ldots \phi_2\phi_1(x_i) = f_i(x_1, \ldots, x_n)$ and a private key $\pi^{-1} = \phi_1^{-1}\phi_2^{-1} \ldots \phi_k^{-1}$, where each term of the form $\phi_i$ is a tame automorphism.

4. The method of claim 3 characterized in that the public key is made publicly available.

5. The method of claim 4 characterized in that the private key is maintained privately.

6. A computer system for transmitting electronic messages comprising encoding means for encrypting a plain text message into a cyphertext message; and decoding means for decrypting the cyphertext message, characterized in that said encoding means utilizes a tame automorphism based encryption algorithm and the decoding means utilizes a tame automorphism based decryption algorithm, said tame automorphism based encryption and decryption algorithms using a product of at least two automorphism based polynomials as an encryption key and a mapping of the inverse of said encryption key as a decryption key in said encoding means and said decrypting means.

7. The computer system of claim 6 characterized in that the tame automorphism based algorithm includes an equation of one of the forms in any order of the variables $x_1, \ldots, x_n$:

(1): $\phi_1(x_1) = x_1 + h_{11}(x_2, \ldots, x_n) = y_1$;
(2): $\phi_1(x_2) = x_2 + h_{12}(x_3, \ldots, x_n) = y_2$;
...
(j): $\phi_1(x_j) = x_j + h_{ij}(x_{j+1}, \ldots, x_n) = y_j$;
...
(n): $\phi_1(x_n) = x_n = y_n$; and any linear transformation of the above referenced equations, where each term of the form $h_{ij}(x_{j+1}, \ldots, x_n)$ is a polynomial of a known order.

8. The computer system of claim 7 characterized in that the tame automorphism based algorithm utilizes two encryption keys, a public key $\pi(x_i) = \phi_k \ldots \phi_2\phi_1(x_i) = f_i(x_1, \ldots, x_n)$ and a private key $\pi^{-1} = \phi_1^{-1}\phi_2^{-1} \ldots \phi_k^{-1}$, where $\phi_i$ is a tame automorphism.

9. The computer system of claim 8 characterized in that the public key is made publicly available.

10. The computer system of claim 9 characterized in that the private key is maintained privately.

11. A method of preserving the integrity and privacy of data comprising the steps: applying an encryption algorithm to encode the data into a cyphertext; decrypting the cyphertext data, characterized in the applying and decrypting steps utilize a tame automorphism based algorithm using a product of at least two automorphism based polynomials as an encryption key and a mapping of the inverse of said encryption key as a decryption key in said applying and decrypting steps.

12. The method of claim 11 characterized in that the tame automorphism based algorithm includes an equation of one of the forms in any order of the variables $x_1, \ldots, x_n$:

(1): $\phi_1(x_1) = x_1 + h_{11}(x_2, \ldots, x_n) = y_1$;
(2): $\phi_1(x_2) = x_2 + h_{12}(x_3, \ldots, x_n) = y_2$;
...
(j): $\phi_1(x_j) = x_j + h_{ij}(x_{j+1}, \ldots, x_n) = y_j$;
...
(n): $\phi_1(x_n) = x_n = y_n$; and any linear transformation of the above mentioned equations, where each term of the form $h_{ij}(x_{j+1}, \ldots, x_n)$ is a polynomial of a known order.

13. The method of claim 12 characterized in that the tame automorphism algorithm utilizes two encryption keys, a public key $\pi(x_i) = \phi_k \ldots \phi_2\phi_1(x_i) = f_i(x_1, \ldots, x_n)$ and a private key $\pi^{-1} = \phi_1^{-1}\phi_2^{-1} \ldots \phi_k^{-1}$, where where each term of the form $\phi_i$ is a tame automorphism.

14. The method of claim 13 characterized in that the public key is made publicly available.

15. The method of claim 14 characterized in that the private key is maintained privately.

16. A method of verifying the authenticity of a product comprising the steps: applying a private key encryption algorithm to encode a serial number of the product into a cyphertext; decrypting the cyphertext serial numbers using the public key to verify the authenticity of the product, characterized in the applying and decrypting steps utilize a tame automorphism based algorithm using a product of at least two automorphism based polynomials as an encryption key and a mapping of the inverse of said encryption key as a decryption key in said applying and decrypting steps.

17. The method of claim 16 characterized in that the tame automorphism based algorithm includes an equation of one of the forms in any order of the variables $x_1, \ldots, x_n$:

(1): $\phi_i(x_1) = x_1 + h_{i1}(x_2, \ldots, x_n) = y_1$;
(2): $\phi_i(x_2) = x_2 + h_{i2}(x_3, \ldots, x_n) = y_2$;
...
(j): $\phi_i(x_j) = x_j + h_{ij}(x_{j+1}, \ldots, x_n) = y_j$;
...
(n): $\phi_i(x_n) = x_n = y_n$; and any linear transformation of the above mentioned equations, where each term of the form $h_{ij}(x_{j+1}, \ldots, x_n)$ is a polynomial of a known order.

18. The method of claim 17 characterized in that the tame automorphism utilizes two encryption keys, a public key $\pi(x_i) = \phi_k \ldots \phi_2\phi_1(x_i) = f_i(x_1, \ldots, x_n)$ and a private key $\pi^{-1} = \phi_1^{-1}\phi_2^{-1} \ldots \phi_k^{-1}$, where where each term of the form $\phi_i$ is a tame automorphism.

19. The method of claim 18 characterized in that the public key is made publicly available.

20. The method of claim 19 characterized in that the private key is maintained privately.

21. A method of avoiding unauthorized alteration of data in a data storage card comprising the steps: applying the private key encryption algorithm to encode the modification of data in the data storage card; decrypting the encrypted data using the public key, characterized in the applying and decrypting steps utilize a tame automorphism based algorithm using a product of at least two automorphism based polynomials as an encryption key and a mapping of the inverse of said encryption key as a decryption key in said applying and decrypting steps.

22. The method of claim 21 characterized in that the tame automorphism based algorithm includes an equation of one of the forms in any order of the variables $x_1, \ldots, x_n$:

(1): $\phi_i(x_1) = x_1 + h_{i1}(x_2, \ldots, x_n) = y_1$;
(2): $\phi_i(x_2) = x_2 + h_{i2}(x_3, \ldots, x_n) = y_2$;
...
(j): $\phi_i(x_j) = x_j + h_{ij}(x_{j+1}, \ldots, x_n) = y_j$;
...
(n): $\phi_i(x_n) = x_n = y_n$; and any linear transformation of the above mentioned equations, where each term of the form $h_{ij}(x_{j+1}, \ldots, x_n)$ is a polynomial of a known order.

23. The method of claim 22 characterized in that the tame automorphism based algorithm utilizes two encryption keys, a public key $\pi(x_i) = \phi_k \ldots \phi_2\phi_1(x_i) = f_i(x_1, \ldots, x_n)$ and a private key $\pi^{-1} = \phi_1^{-1}\phi_2^{-1} \ldots \phi_k^{-1}$, where where each term of the form $\phi_i$ is a tame automorphism.

24. The method of claim 23 characterized in that the public key is made publicly available.

25. The method of claim 24 characterized in that the private key is maintained privately.

26. A method of verifying the identity of the sender of electronically transmitted message comprising the steps: transmitting one signal from a non-repeating sequence; applying a private key encryption algorithm to encode the signal into a cyphertext; decrypting the cyphertext signal using a public key, characterized in the applying and decrypting steps utilize a tame automorphism based algorithm using a product of at least two automorphism based polynomials as an encryption key and a mapping of the inverse of said encryption key as a decryption key in said applying and decrypting steps.

27. The method of claim 26 characterized in that the tame automorphism based algorithm includes an equation of one of the forms in any order of the variables $x_1, \ldots, x_n$:

(1): $\phi_i(x_1) = x_1 + h_{i1}(x_2, \ldots, x_n) = y_1$;
(2): $\phi_i(x_2) = x_2 + h_{i2}(x_3, \ldots, x_n) = y_2$;
...
(j): $\phi_i(x_j) = x_j + h_{ij}(x_{j+1}, \ldots, x_n) = y_j$;
...
(n): $\phi_i(x_n) = x_n = y_n$; and any linear transformation of the above mentioned equations, where each term of the form $h_{ij}(x_{j+1}, \ldots, x_n)$ is a polynomial of a known order.

28. The method of claim 27 characterized in that the tame automorphism based algorithm utilizes two encryption keys, a public key $\pi(x_i) = \phi_k \ldots \phi_2\phi_1(x_i) = f_i(x_1, \ldots, x_n)$ and a private key $\pi^{-1} = \phi_1^{-1}\phi_2^{-1} \ldots \phi_k^{-1}$, where each term of the form $\phi_i$ is a tame automorphism.

29. The method of claim 28 characterized in that the public key is made publicly available.

30. The method of claim 29 characterized in that the private key is maintained privately.

31. A method of creating ordinary public key from a master public key in a two key encryption system comprising the steps of replacing a portion of the encryption polynomial with zero values, characterized in that the encryption polynomial utilizes a tame automorphism based algorithm using a product of at least two automorphism based polynomials as an encryption key and a mapping of the inverse of said encryption key as a decryption key in the two key encryption system.

32. The method of claim 31 characterized in that the tame automorphism based algorithm includes an equation of one of the forms in any order of the variables $x_1, \ldots, x_n$:

(1): $\phi_i(x_1) = x_1 + h_{i1}(x_2, \ldots, x_n) = y_1$;
(2): $\phi_i(x_2) = x_2 + h_{i2}(x_3, \ldots, x_n) = y_2$;
...
(j): $\phi_i(x_j) = x_j + h_{ij}(x_{j+1}, \ldots, x_n) = y_j$;
...
(n): $\phi_i(x_n) = x_n = y_n$; and any linear transformation of the above mentioned equations, where each term of the form $h_{ij}(x_{j+1}, \ldots, x_n)$ is a polynomial of a known order.

* * * * *